United States Patent [19]

Hrabal

[11] 4,193,424
[45] Mar. 18, 1980

[54] LAMINA VALVE FOR RECIPROCATING COMPRESSORS

[75] Inventor: Hans Hrabal, Vienna, Austria

[73] Assignee: ENFO Grundlagen Forschungs AG, Aargau, Switzerland

[21] Appl. No.: 839,189

[22] Filed: Oct. 4, 1977

[30] Foreign Application Priority Data

Oct. 6, 1976 [AT] Austria ............................ 7423/76

[51] Int. Cl.² ........................................... F16K 15/14
[52] U.S. Cl. ................................... 137/855; 417/571
[58] Field of Search ........................ 137/855–858, 137/516.11, 516.13, 516.15, 516.17, 516.19, 512.15; 417/571

[56] References Cited

U.S. PATENT DOCUMENTS

| 3,568,712 | 3/1971 | Rinehart | 137/855 |
| 3,807,444 | 4/1974 | Fortune | 137/855 X |
| 3,896,847 | 7/1975 | Bauer | 137/512.15 X |

FOREIGN PATENT DOCUMENTS

1129784 5/1962 Fed. Rep. of Germany.
2260520 12/1972 Fed. Rep. of Germany.
861615 2/1961 United Kingdom ................. 137/855

*Primary Examiner*—Robert G. Nilson
*Attorney, Agent, or Firm*—Watson, Cole, Grindle & Watson

[57] ABSTRACT

In a valve where a port is opened and closed by movement of a lamina away from or towards the port, the lamina is held between two adjacent parts of the valve. To ensure that the lamina is held rigidly in place, it is provided with resiliently deformable projections on its side facing away from the port which it is to close.

3 Claims, 10 Drawing Figures

LAMINA VALVE FOR RECIPROCATING COMPRESSORS

FIELD OF THE INVENTION

This invention relates to a lamina valve for a reciprocating compressor, comprising at least one flexible lamina which controls one or more ports provided in a seating plate and is clamped at a distance therefrom between the seating plate and an adjacent member, e.g. the compressor cylinder or the cylinder head.

BACKGROUND OF THE INVENTION

The flexible laminae of such lamina valves previously have been almost exclusively clamped by wedging in the plane of a gasket which is inserted between the seating plate and its adjacent member which follows this. Generally however, the laminae are thinner than the gasket, so that it is not possible to easily clamp them together with the gasket. A number of special measures must be taken to obtain film clamping. Furthermore, it is important in lamina valves for the laminae not to slip during assembly and to be clamped in the correct position, as otherwise they are unable to tightly cover the ports in the seating plate.

It is known to compensate for the difference in thickness between the laminae and gasket by means of a spacer of resilient material, which is inserted under the clamped region of the lamina before the clamping operation. The position of the lamina is ensured in this case by two pins which are anchored relative to the seating plate and pass through bores in the lamina and spacer. German Offenlegungsschrift No. 2,260,520 describes such a construction in which a wedge of metal is used as the spacer, which can be fixed to the side of the lamina. According to German Auslegeschrift No. 1,129,784, a depression is provided for the clamped region of the lamina in that clamping surface facing the seating plate, and the gasket is placed first over this depression. This therefore dispenses with a separate spacer, but it is necessary to provide the depression and this represents an additional cost.

SUMMARY OF THE INVENTION

The object of the invention is to simplify the clamping of flexible laminae of lamina valves and their correct positioning in the valve such that neither additional spacers nor depressions or other recesses in the clamping surfaces are necessary, and in addition any special positioning precautions can be dispensed with.

According to the invention, that side of the lamina facing away from the seating plate is of uneven form, e.g. is corrugated or provided with upwardly bent tangs, lugs, other projections or embossing, which are resiliently yielding. These resilient projections, bent outwardly from the plane of the lamina, compensate for the difference in thickness between the gasket and lamina and also prevent unintended slipping of the lamina during and after assembly. It is sufficient to merely insert the lamina next to the gasket between the seating plate and the member connected thereto, in particular the compressor cylinder or cylinder head. Any manufacturing tolerances or differences in the thickness of the resilient gasket are also compensated for.

In a further embodiment of the lamina valve according to the invention, the lamina, at least in its clamped region, is inserted with close fitting into a recess in a gasket laid on the member which clamps it, and is thus protected against tilting. In this case the gasket holds the lamina before and after clamping in the correct position, so facilitating assembly and dispensing with the arrangement of additional members for positioning purposes.

In a preferred embodiment of the invention, the lamina is of uneven form in the region of its two ends and is clamped thereat, and a flexible tang is cut from the lamina for covering the ports in the seating plate. The resilient projections on the two clamped ends insure that the lamina is pressed against the seating plate over its entire surface, so that the correct position and trouble-free operation of the flexible tang is insured as it controls the ports of the seating plate.

DETAILED DESCRIPTION OF THE EMBODIMENTS

Figure 1:
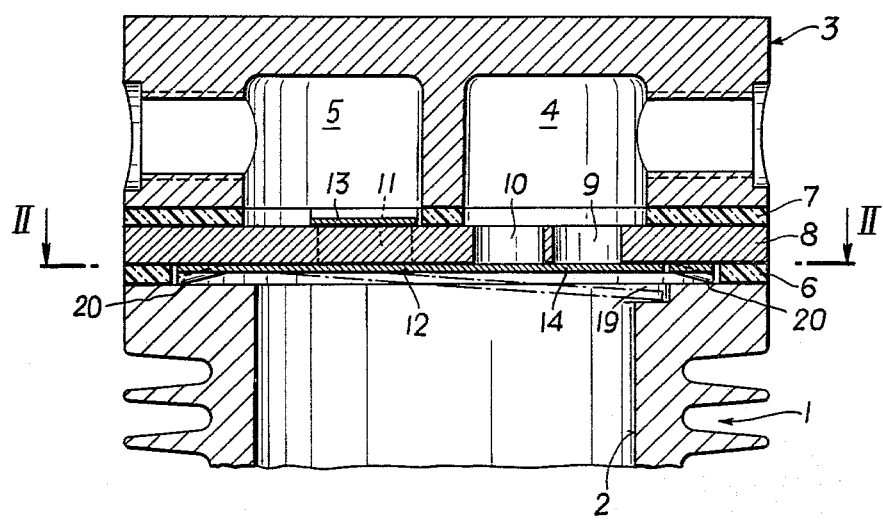
FIG. 1 is an axial cross section through the top of a reciprocating compressor with a lamina valve according to the invention inserted.

The compressor shown in FIG. 1 comprises a cylinder 1 containing a cylinder bore 2, and a cylinder head 3 comprising a suction chamber 4 and pressure chamber 5. A valve seating plate 8 is clamped by way of gaskets 6 and 7 between the cylinder 1 and cylinder head 3, and comprises three ports indicated by 9, 10 and 11. The ports 9 and 10 lead into the suction chamber 4 and are controlled by a suction lamina 12 clamped between the cylinder 1 and seating plate 8. A pressure lamina 13 of strip form is situated in the pressure chamber 5 and is clamped between the seating plate 8 and the cylinder head 3.

Figure 2:
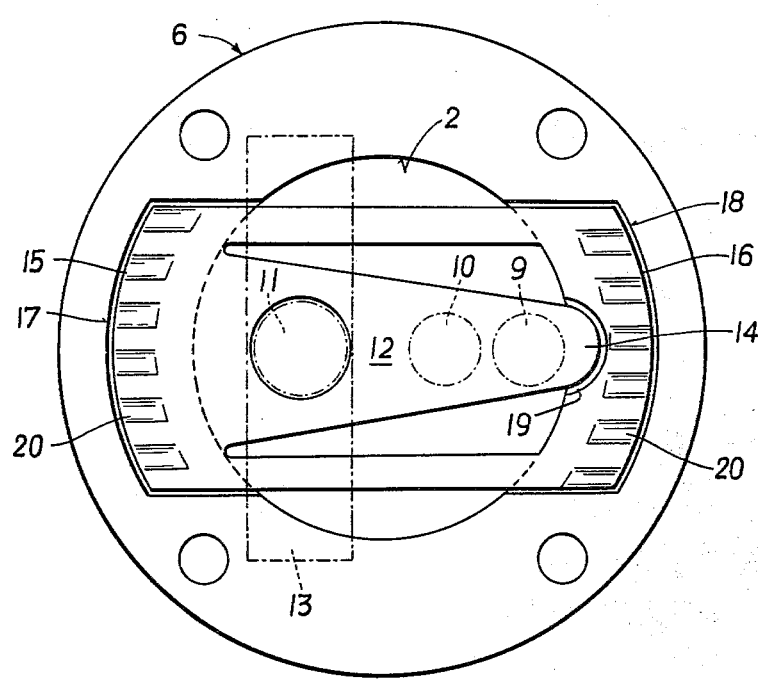
FIG. 2 is a section on the line II—II of FIG. 1.

The form of the suction lamina 12 can be seen in FIG. 2. It consists of a substantially rectangular plate from which a flexible tang 14 is cut. The lamina 12 diametrically bridges the cylinder bore 2 and its ends 15 and 16 engage with slight clearance in recesses 17 and 18 in the gasket 6, by which means the lamina 12 is fixed in its position. The tang 14 controls the suction ports 9 and 10, its end butting on the edge of the cylinder 1, in which a recess 19 is provided in order to increase the lift.

The ends 15 and 16 of the lamina 12 are of uneven shape. In the embodiment shown in FIG. 1, corrugations 20 are provided, projecting against the cylinder 1 from that side of the lamina 12 facing away from the seating plate 8. The corrugations 20 are substantially of the same height or higher than the gasket 6, so that the lamina 12 may be firmly clamped together with the gasket 6 without spacers, and without the need for special recesses or the like. The gasket 6 may also be so sized that the corrugations 20 are pressed together completely into the plane of the lamina 12. Because of the substantially clearance-free embedding of the lamina 12 into the recesses 17 and 18 in the gasket 6 in accordance with FIG. 2, special precautions for fixing the position of the lamina 12 may be dispensed with.

Figure 3:
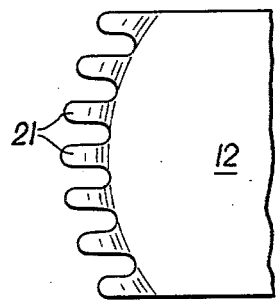
FIGS. 3 to 10 show various embodiments of an uneven end of a lamina in plan and elevation respectively.
Figure 5:
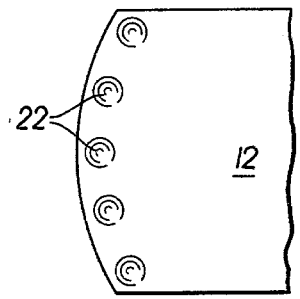
Figure 4:
Figure 6:
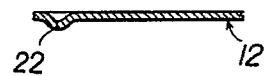
Figure 7:
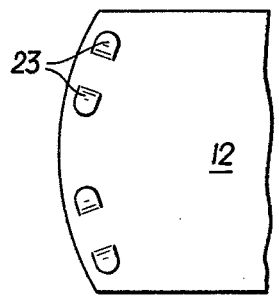
Figure 9:
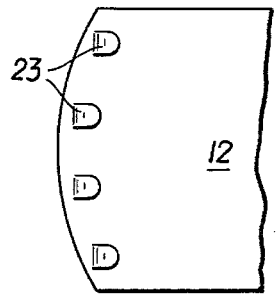
Figure 8:
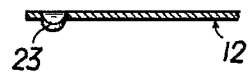
Figure 10:

Instead of corrugations 20, the ends 15 and 16 of the lamina 12 may be made uneven in other ways. In the embodiment shown in FIGS. 3 and 4, the clamped end of the lamina 12 is undulated to produce tangs 21 which, as shown in FIG. 4, are bent over away from the seating plate 8. In FIGS. 5 and 6, embossing 22 is provided, and FIGS. 7 to 10 show two variations of lugs 23, produced by making substantially semi-circular cuts in the end of the lamina 12 and then bending outwardly, as shown in FIGS. 8 and 10. These various projections also facilitate firm clamping of the lamina 12 together with the provided gasket.

In contrast to the embodiment shown in FIG. 2, the laminae may be clamped only at one end, and project in the form of a tang or strip with the other end free. The pressure lamina 13 shown in FIG. 1, which is not illustrated in greater detail, could have such a form. These laminae also comprise an uneven form at the clamped end, substantially as indicated in FIGS. 3 to 10, and are firmly clamped together with the gasket between the seating plate 8 and cylinder 1 or cylinder head 3.

I claim:

1. In a compressor having a cylinder containing a cylinder bore, a cylinder head, a seating plate disposed between said cylinder and said head and having at least one port therein, a gasket of a first predetermined thickness disposed between said plate and said cylinder, and a lamina valve between said plate and said cylinder and lying inwardly of said gasket, said valve bearing against a surface of said seating plate for closing said port and being movable away from said port for opening same, the improvement wherein said valve comprises a lamina plate having opposed ends bridging said cylinder bore and being clamped in place at said ends, said lamina plate having a second predetermined thickness less than said first thickness and having resilient projections at at least one of said ends, said projections extending away from said surface of said seating plate and toward said cylinder, said projections having a thickness at least equal to said first thickness of said gasket and bearing against an end surface of said cylinder, said surfaces lying parallel to one another, whereby said projections compensate for any difference in thickness between said lamina plate and said gasket and further prevent any shifting of said lamina plate relative to said seating plate when said seating plate is clamped down over said cylinder.

2. The lamina valve according to claim 1, wherein said projections are provided at both said opposing ends of said lamina plate for securely maintaining said lamina plate at said opposing ends between said seating plate and said cylinder, and said lamina plate including a flexible tongue formed therein, said tongue bearing against said port and being movable away therefrom.

3. The lamina valve according to claim 1, wherein said gasket has opposed recesses therein, said opposed ends of said lamina plate being snugly received in said recesses to thereby avoid any shifting of said lamina plate relative to said gasket and to further facilitate accurate positioning of said lamina plate in place.

* * * * *